No. 893,972. PATENTED JULY 21, 1908.
W. C. BAYLESS.
EYE GUARD AND SHIELD FOR SPECTACLES.
APPLICATION FILED NOV. 21, 1907.
Fig. 1
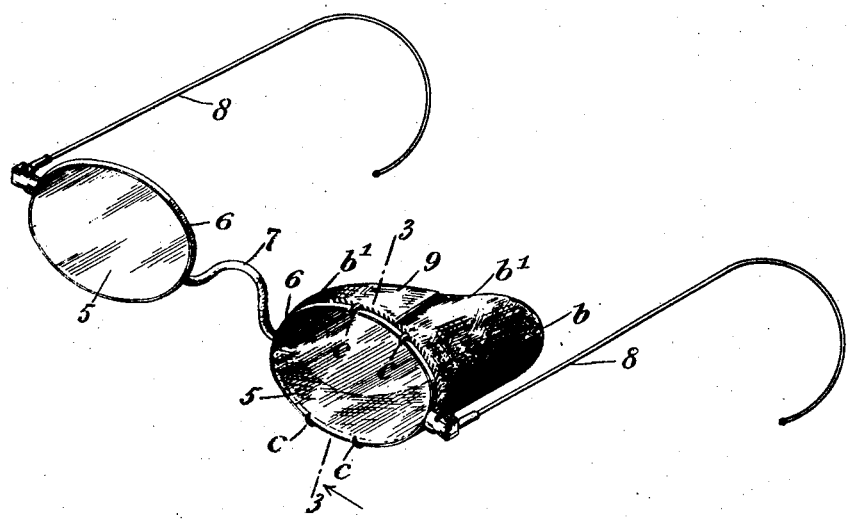
Fig. 2
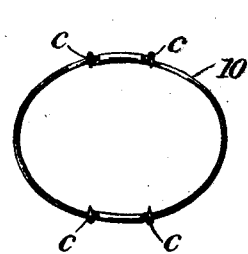
Fig. 3
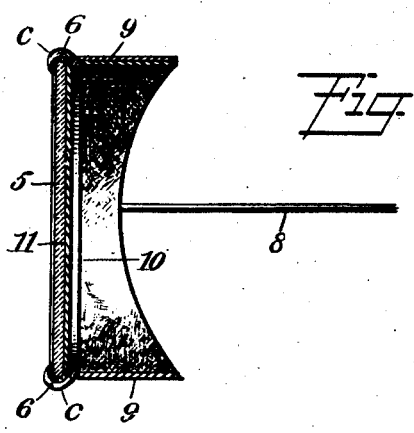
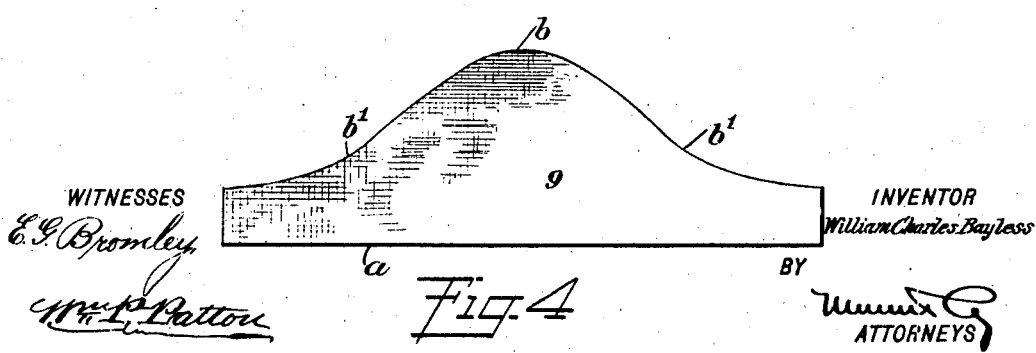
Fig. 4
WITNESSES
E. G. Bromley
INVENTOR
William Charles Bayless
BY
ATTORNEYS

UNITED STATES PATENT OFFICE.

WILLIAM CHARLES BAYLESS, OF JEFFERSON CITY, TENNESSEE, ASSIGNOR OF ONE-HALF TO L. M. KING, OF DANDRIDGE, TENNESSEE.

EYE GUARD AND SHIELD FOR SPECTACLES.

No. 893,972.   Specification of Letters Patent.   Patented July 21, 1908.

Application filed November 21, 1907. Serial No. 403,172.

*To all whom it may concern:*

Be it known that I, WILLIAM CHARLES BAYLESS, a citizen of the United States, and a resident of Jefferson City, in the county of Jefferson and State of Tennessee, have invented a new and Improved Eye Guard and Shield for Spectacles, of which the following is a full, clear, and exact description.

This invention relates to an eye shield and guard that may be readily attached to and removed from spectacles, either to protect an inflamed eye, or serve as a shield for a blind optic or one that is disfigured or removed; and has for its object to provide novel details of construction for a device of the character indicated, which may be quickly attached to the rim of a spectacle frame that supports a lens for spectacles, be readily removed therefrom, and when in position afford a lateral guard for the eye, or if desired a non-transparent or colored disk for covering the eye, and coacting with the lateral guard to screen it from the light when necessary and also to protect it from dust, cold or wind.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a perspective view showing a pair of spectacles and the improvement mounted thereon; Fig. 2 is a detached side view of a novel spring clamp that is a detail of the invention; Fig. 3 is an enlarged transverse sectional view of the improvement, substantially on the line 3—3 in Fig. 1; and Fig. 4 is a side view of the improved lateral guard flattened out to show its marginal form.

The improved eye protector may be provided for either lens of spectacles, or both lenses, as may be required, and may be used in conjunction with spectacles having lenses of any power to suit the vision of the person wearing the glasses.

In the drawings, the improvements are shown as constructed for use to protect the left eye of the wearer, and consists of the following details:

In Fig. 1 a pair of spectacles is shown of ordinary style, in which 5 represents the lenses, 6 the rims spaced apart by the bow piece 7 that rests on the nose when the glasses are worn, and 8 are the temples for holding them in position for use. The lateral guard 9 may be formed of leather, rubber, cloth, or other suitable material, and its originally flat body is marginally shaped as shown in Fig. 4, having sufficient length to adapt it for encircling the rim 6 of the spectacles wherein the lens 5 is secured. As represented, one side edge $a$ of the guard 9 is straight and the opposite edge is undulating, having a central curvature at $b$ that defines the point of greatest width of the guard piece. From $b$ the edge is sloped toward each end of the guardpiece and slightly concaved as at $b'$. A spring clamping ring 10, formed of thin resilient wire, is given oval form and is of such relative dimensions that when applied it will have contact with the rim 6 and margin of the lens 5 where it is gripped by the rim. The material forming the lateral guard 9 is bent into oval form, having the ends thereof lapped upon each other and secured together. The size of the oval guard piece 9 is so proportioned, that it will have about equal dimension in the opening it defines with that of the clamping ring 10, so that they will conform one with the other when the clamping ring is seated upon the straight edge $a$, and thereto secured by any preferred means which will be available for the purpose, this being determined by the material of which the guard piece 9 is constructed. Upon the resilient ring 10, four rigid hooks $c$ are secured, these hooks being oppositely disposed in pairs, two on the normally upper portion of the ring, and two on the lower part thereof, as is clearly shown in Fig. 2. The hooks $c$ all trend forwardly, two downwardly and two upwardly, and are of an equal size which adapts them for a hooked engagement with a corresponding rim 6 of the spectacles whereon the device is to be detachably mounted. One method of forming the hooks $c$ upon the resilient body of the ring 10 consists in constructing said ring in two equal parts, forming the hooks on the ends of said parts or sections, then lapping the end portions together and soldering said lapped portions, thus joining the sections and projecting the hooks at the same side of the ring. The lateral guard piece 9 is so relatively constructed and arranged, that when placed upon the rim of the spectacles the curved and widest portion $b$ of said guard piece will be located adjacent to the temple 8 that is nearest the rim 6 and lens therein, as shown in Fig. 1.

If the device is to be employed for protection of the eye or eyes from dust, cold and wind, the lateral guard which has been described, may be employed as an attachment for the lenses of the spectacles, as it or they will be fitted closely upon the flesh around the eye socket or sockets and exclude the elements.

The invention further embodies a lens screen 11, that may be used singly or in duplicate for covering one or both lenses of the spectacles. The screen 11 is formed of celluloid or other available material, and in dimensions and marginal shape is the counterpart of the glass lens, but is quite thin, and rendered opaque or nearly so, and may be colored green or other tint as may be preferred.

The lens screen 11, as its name indicates, is designed to obscure light that may pass through the transparent lens, and to this end is fitted into the space defined by the clamping hooks c, so as to be impinged at its edge upon the clamping ring 10 at its front face. The thickness of the lens screen is such that it will permit the hooked attachment of the clamping ring 10 upon the rim 6, and thus secure the lens screen in position for service at the side of the lens nearest to the eye of the wearer of the spectacles.

The lens screen is of service to protect a diseased eye or eyes, that dare not be exposed to light rays, as the opaque or translucent screen disk will obviously effect such protection. It will also be noted that a blind, deformed, or repulsive looking eye, may be concealed, as well as an empty eye socket, if the lens screen is worn.

It is obvious that the lens screen or screens if they are used in duplicate, may be readily detached, and the lateral guard or guards worn, or the complete attachment may be quickly removed when this is desired.

Having thus described my invention, I claim as new and desire to secure by Letters Patent,—

1. The combination with a spectacle frame, having an oval rim, and a transparent lens held therein, of a thin translucent lens-shield of similar contour and area with the lens and on the inner side thereof, and a resilient wire clamping ring having hooks thereon which first receive the edge of the shield and then engage the rim of the spectacle frame, whereby the lens shield is removably clamped upon a side of the lens inside the rim.

2. In a device of the character described, the pair of clamping rings each formed of two pieces of resilient wire, bent into looped form and lapped at and near their ends and then secured together where they are lapped, ends of said looped wires being formed into hooks that are all bent outward from the wire rings.

3. The combination with a pair of spectacles, of a guard oval in shape and provided at one end with a resilient ring of similar shape and having a plurality of hooks engaging a lens frame to hold the guard thereto, and a thin oval lens shield of translucent material and separate from the guard, said shield being arranged between the lens frame and the ring of the guard with the hooks of the guard extending over its edge and holding it in position.

4. An eye guard and shield, comprising a guard oval in shape, a resilient ring corresponding in shape to that of the guard and secured to one end of the same, said ring being provided with a plurality of hooks for engaging a lens frame to secure the guard thereto, and a thin oval lens shield of translucent material and separate from the guard, said shield fitting against the ring of the guard within the space defined by the hooks and held in position by said hooks, whereby provision is made for holding the shield on the guard and for securing the guard and shield to a spectacle frame.

In testimony whereof I have signed my name to this specification in the presence of two subscribing witnesses.

WILLIAM CHARLES BAYLESS.

Witnesses:
J. B. HUFF,
A. P. GODWIN.